US011517143B2

(12) United States Patent
Dionisio et al.

(10) Patent No.: US 11,517,143 B2
(45) Date of Patent: Dec. 6, 2022

(54) ESPRESSO COFFEE MACHINE WITH IMPROVED SYSTEM FOR REGULATING THE TEMPERATURE OF THE WATER AND METHOD FOR REGULATING THE TEMPERATURE OF THE WATER IN AN ESPRESSO COFFEE MACHINE

(71) Applicant: LA MARZOCCO S.R.L., Scarperia (IT)

(72) Inventors: Andrea Dionisio, Scarperia (IT); Guido Salvi, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 546 days.

(21) Appl. No.: 16/494,392

(22) PCT Filed: Mar. 20, 2018

(86) PCT No.: PCT/IB2018/051865
§ 371 (c)(1),
(2) Date: Sep. 16, 2019

(87) PCT Pub. No.: WO2018/172937
PCT Pub. Date: Sep. 27, 2018

(65) Prior Publication Data
US 2020/0093323 A1 Mar. 26, 2020

(30) Foreign Application Priority Data
Mar. 24, 2017 (IT) .................. 102017000032502

(51) Int. Cl.
*A47J 31/52* (2006.01)
*A47J 31/56* (2006.01)
*A47J 31/34* (2006.01)

(52) U.S. Cl.
CPC ............... *A47J 31/56* (2013.01); *A47J 31/34* (2013.01); *A47J 31/5253* (2018.08); *A47J 31/525* (2018.08)

(58) Field of Classification Search
CPC .. A47J 31/24; A47J 31/30; A47J 31/34; A47J 31/525; A47J 31/5253
(Continued)

(56) References Cited

U.S. PATENT DOCUMENTS 6,459,854 B1    10/2002  Yoakim et al.
8,850,959 B2    10/2014  Banchi et al.
(Continued)

FOREIGN PATENT DOCUMENTS

CA    2962617 A1    4/2016
CN    1424886 A     6/2003
(Continued)

OTHER PUBLICATIONS

Chinese Office Action and English translation dated Mar. 31, 2021 in Chinese Application 201880018668.5.
(Continued)

*Primary Examiner* — Reginald Alexander
(74) *Attorney, Agent, or Firm* — Nixon & Vanderhye P.C.

(57) ABSTRACT

An espresso coffee machine is described, said machine comprising: a dispensing group and a corresponding coffee boiler containing water under pressure; a heater device for heating the water in the coffee boiler; a temperature sensor for measuring the temperature of the water in the coffee boiler; a processor connected to said sensor and configured to drive said heater device so that the water in the coffee boiler is at a set reference temperature, wherein said processor comprises a feedback system; and wherein the value of said set reference temperature is varied as a function of at least one of the following parameters: (a) a first parameter (Continued)

which is a function of the time elapsed from an operating cycle of the machine or a frequency of use of the machine within a time interval; (b) a second parameter which is a function of the temperature of a component of the machine; and (c) a third parameter which is a function of the environment.

15 Claims, 3 Drawing Sheets

(58) Field of Classification Search
USPC .............................................. 99/281, 302 R
See application file for complete search history.

(56) References Cited

U.S. PATENT DOCUMENTS

| | | | |
|---|---|---|---|
| 2006/0278093 A1 | 12/2006 | Biderman et al. | |
| 2012/0222666 A1 | 9/2012 | Morgandi | |
| 2013/0330453 A1 | 12/2013 | Doglioni Majer | |
| 2014/0314921 A1 | 10/2014 | Kuempel et al. | |
| 2014/0322401 A1* | 10/2014 | Etter | A47J 31/56 99/281 |
| 2015/0223635 A1* | 8/2015 | Mulvaney | A47J 31/4482 392/441 |
| 2018/0168391 A1* | 6/2018 | Eriksson | A47J 31/545 |
| 2019/0125123 A1* | 5/2019 | Startz | A47J 31/52 |

FOREIGN PATENT DOCUMENTS

| | | |
|---|---|---|
| CN | 101229019 A | 7/2008 |
| CN | 201401779 Y | 2/2010 |
| CN | 102595984 A | 7/2012 |
| CN | 103118574 A | 5/2013 |
| CN | 105640339 A | 6/2016 |
| CN | 106073509 A | 11/2016 |
| DE | 10 2011 116 913 A1 | 9/2012 |
| EP | 2 789 276 | 10/2014 |
| WO | 1 898 758 B1 | 11/2006 |
| WO | 2011/055189 | 5/2011 |
| WO | WO 2014/187110 A1 | 11/2014 |
| WO | 2016/057568 | 4/2016 |
| WO | 2017/009186 | 1/2017 |
| WO | 2017/009189 | 1/2017 |

OTHER PUBLICATIONS

Yingile et al., "Optimal Tuning of Temperature Control Parameters for Post-Mixed Beverage Machines Based on Changes in Thermal Load", Computer Technology and Automation, vol. 30, Issue 1, Mar. 15, 2011, pp. 33-38.
International Search Report for PCT/IB2018/051865, dated Jul. 2, 2018, 3 pages.
Written Opinion of the ISA for PCT/IB2018/051865, dated Jul. 2, 2018, 5 pages.

* cited by examiner

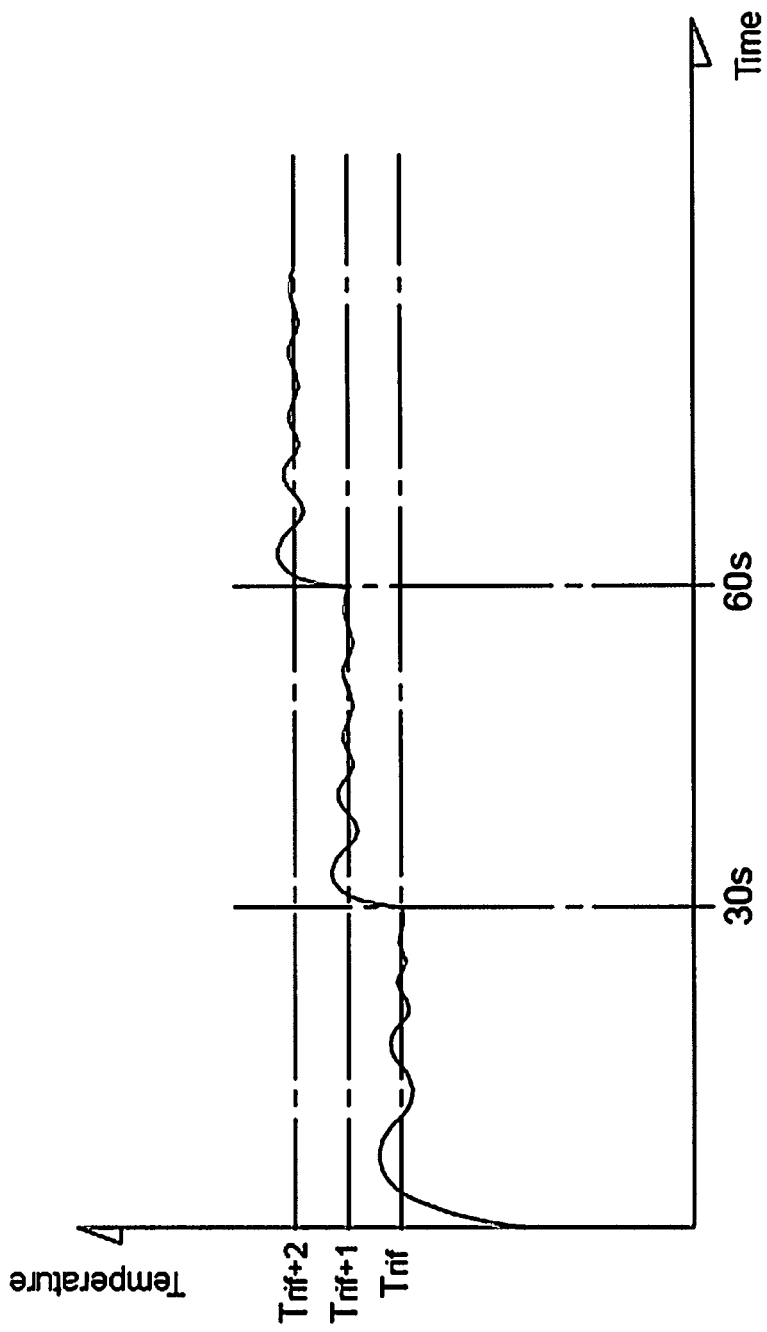

ESPRESSO COFFEE MACHINE WITH IMPROVED SYSTEM FOR REGULATING THE TEMPERATURE OF THE WATER AND METHOD FOR REGULATING THE TEMPERATURE OF THE WATER IN AN ESPRESSO COFFEE MACHINE

This application is the U.S. national phase of International Application No. PCT/IB2018/051865 filed 20 Mar. 2018, which designated the U.S. and claims priority to IT Patent Application No. 102017000032502 filed 24 Mar. 2017, the entire contents of each of which are hereby incorporated by reference.

BACKGROUND OF THE INVENTION

The present invention relates in general to the sector of machines for the preparation of beverages. More particularly, it relates to a machine for preparing espresso coffee (or another beverage) provided with an improved system for regulating the temperature of the water in the boiler. The present invention also relates to a method for regulating the temperature of the water in an espresso coffee machine.

PRIOR ART

EP 2,490,580 relates to a machine for the preparation of coffee or the like. The machine comprises one or more operating groups, each of which comprises at least one boiler, a pump, a heating unit, and a unit for extracting the aromas and dispensing the espresso coffee infusion via the associated ducts. Each group is provided with a system for controlling and regulating parameters for production of the espresso coffee. According to one embodiment, the machine comprises means for modulating the pressure for extraction of the espresso coffee infusion. According to one embodiment, the machine comprises means for regulating the temperature for extraction of the espresso coffee infusion. According to one embodiment, the machine comprises a control unit which contains various stored pressure profiles which can be called up by the operator.

The water necessary for percolation of the coffee is usually heated by means of direct or indirect contact thereof with a heating element, normally an electrical resistance.

In an attempt to ensure a sufficiently stable temperature of the water, espresso coffee machines which use a closed loop regulating system are known. This system comprises a water container (tank), a heating element (for example an electrical resistance or the like), a temperature sensor and a regulating device.

The regulating device causes switching on or switching off of the heating element depending on the temperature sensed by the temperature sensor. In particular if the temperature of the sensor is lower than a reference temperature (desired temperature) the regulating device causes switching on of the heating element otherwise the regulating device causes switching off of the heating element.

WO2017009186 and WO2017009189, in the name of the Applicant, describe lever or piston machines.

EP2,789,276 describes a modular machine.

SUMMARY OF THE INVENTION

The Applicant has noted that the temperature regulating system adopted in known machines does not ensure a sufficient degree of precision. In particular, the Applicant has noted that the precision of the system may be negatively affected by the frequency of use of the machine and/or by other factors, for example the structure of the machine and/or environmental factors.

The Applicant has also noted that the water, along its flow path (from the moment it has been heated until the moment it reaches the puck of coffee powder) comes into contact with metallic (or non-metallic) parts to which it releases heat or, on some occasions, from which it receives heat.

The Applicant also noted that the temperature of the water which reaches the puck of coffee powder may be influenced by the temperature of the room in which the machine is installed.

The Applicant has also noted that the frequency of use of the machine influences significantly the temperature of the water reaching the puck of coffee powder. In other words, if the machine is used substantially continuously, the temperature of the water which reaches the puck of coffee powder is substantially constant and predictable, but in other conditions of use, the temperature varies considerably. As is known, often an espresso coffee machine has peak periods, periods of frequent use, but also has periods of inactivity or sporadic use, which are not entirely predictable a priori. For example, the first coffees dispensed in the morning, after a night of inactivity, are typically dispensed at a temperature lower than that desired.

In any case, for at least some of the aforementioned reasons, the temperature of the water in contact with the coffee powder is different from the reference temperature sensed by the temperature sensor.

The proposed aim of the Applicant is to provide a machine for the preparation of espresso coffee (or other beverage) which supplies heated water so that it reaches the puck of coffee powder at a predefined temperature, independently of the frequency of use of the machine, the flow path of the water and the contact with a number of components and/or environmental factors, in order to obtain a high repeatability and uniformity of quality during dispensing of the beverage.

According to a first aspect, the present invention relates to a machine for preparing and dispensing espresso coffee comprising:
  a water supply;
  a dispensing group and a corresponding coffee boiler containing water under pressure;
  a heater device for heating the water in the coffee boiler;
  a temperature sensor for measuring the temperature of the water in the coffee boiler;
  a processor connected to said temperature sensor and configured to drive said heater device so that said water in the coffee boiler is at a set reference temperature Trif, Trif_new,
  wherein said processor comprises a feedback system; and
  wherein the value of said set reference temperature is varied as a function of at least one of the following parameters:
    (a) a first parameter which is a function of the time elapsed from a machine operating cycle or a frequency of use of the machine within a time interval;
    (b) a second parameter which is a function of the temperature of a component of the machine; and
    (c) a third parameter which is a function of the environment in which the machine is installed.

Preferably, the processor is configured to control the switching on or the switching off of the heater device on the basis of the temperature sensed by the temperature sensor.

The heater device may comprise an electrical resistance.

The feedback system may comprise a Proportional-Integral-Derivative or Proportional-Integrative-Derivative controller.

The first parameter could be function of the time elapsed since the last machine operating cycle.

If the first parameter for varying said set reference temperature (Trif, Trif_new) were to be the time elapsed since the last beverage extraction cycle, with the time elapsed since the last dispensing operation being termed $t_0$, Trif may be modified as follows:

$t_0 < t_1$: Trif_new=Trif+$\Delta T1$;

$t_1 < t_0 < t_2$: Trif_new=Trif+$\Delta T2$;

$t_2 < t_0 < t_3$: Trif_new=Trif+$\Delta T3$;

. . .

$t_{n-1} < t_0 < t_n$: Trif_new=Trif+$\Delta Tn$;

where:

$t_1 < t_2 < \ldots < t_n$ are times and $\Delta T1, \Delta T2, \ldots \Delta Tn$ are temperatures (positive, negative or zero)

where n=1, 2, 3, . . . .

Advantageously, the second parameter could be a function of the temperature of a component of the machine which is contact with a flow of water from the coffee boiler during a beverage dispensing operation.

The third parameter could be a function of a temperature of the environment in which the machine is installed.

According to another aspect, the present invention provides a method for preparing and dispensing espresso coffee comprising:

supplying water in a coffee boiler containing water under pressure;
providing a dispensing group;
heating the water in the coffee boiler;
measuring the temperature of the water in the coffee boiler;
controlling the heating of the water in the coffee boiler so that said water in the coffee boiler is at a set reference temperature;
providing a feedback system; and
varying said value of said reference temperature as a function of at least one of the following parameters:
(a) a first parameter which is a function of the time elapsed from a machine operating cycle or a frequency of use of the machine within a time interval;
(b) a second parameter which is a function of the temperature of a component of the machine; and
(c) a third parameter which is a function of the environment in which the machine is installed.

The present invention will become completely clear from the following detailed description, provided by way of a non-limiting example, to be read with reference to the attached drawings in which:

FIG. 3 is another temperature vs. time graph.

FIG. 1 is a simplified hydraulic diagram. In particular, the hydraulic diagram in FIG. 1 shows only a few components of an espresso coffee machine, i.e. those which are necessary for understanding the present invention.

Figure 1:
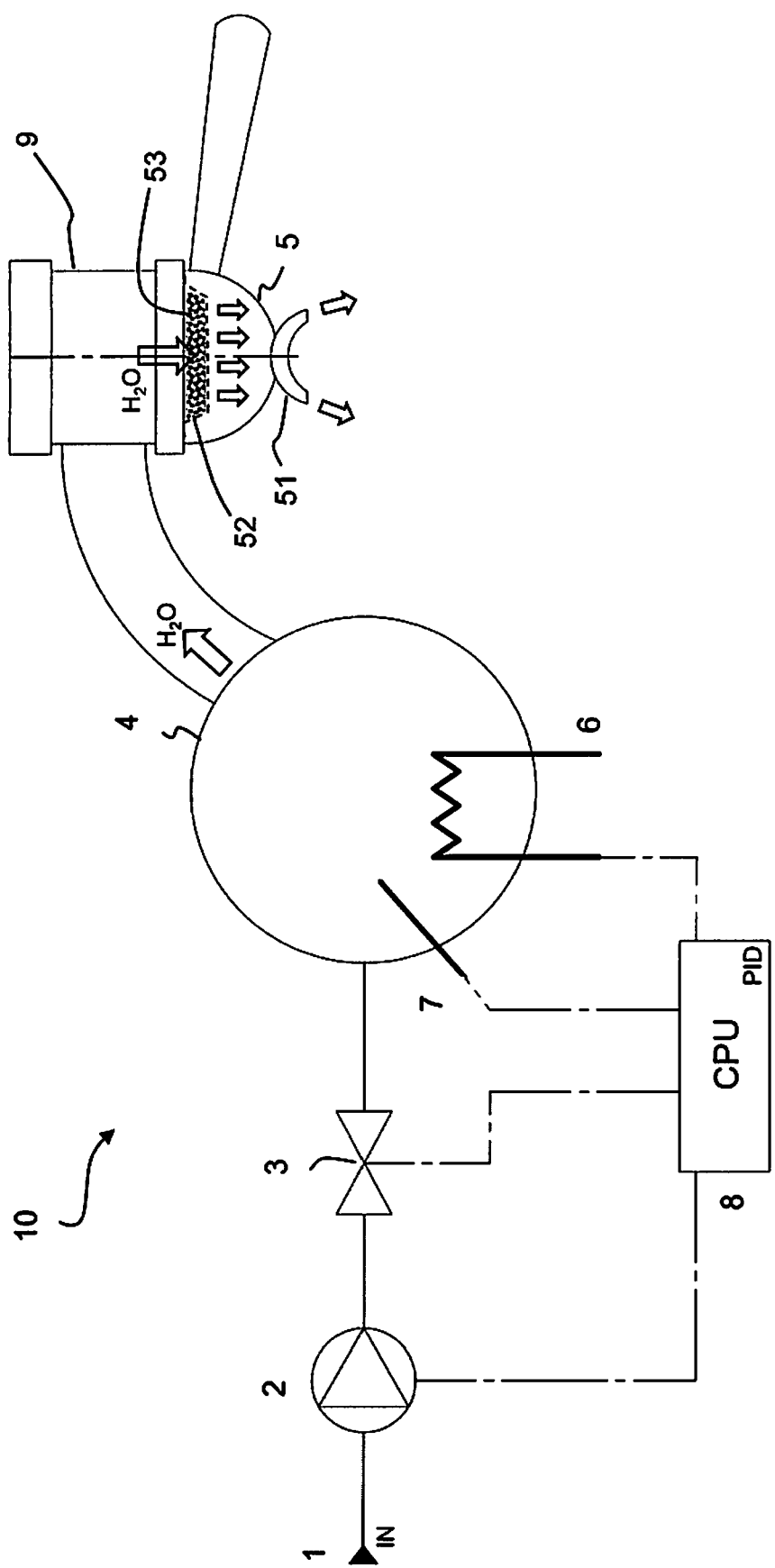
FIG. 1 is a simplified hydraulic diagram which shows only the essential elements for comprehension of the present invention.

The description below, for the sake of convenience, refers in particular to an espresso coffee machine, but the present invention is not limited to such machines and is applicable to machines for dispensing other beverages. For example, barley powder or another cereal powder may be used instead of coffee powder. Therefore, the expression "espresso coffee machine" must be understood as comprising also machines for preparing other beverages. Similarly, the expression "espresso coffee" must be understood as having a wider meaning corresponding to the product (coffee, barley or other cereal) used for the preparation of the beverage.

The machine to which the present invention relates may also be a machine of the lever or piston type. By way of a further alternative, the present invention may also be applied to a machine of the modular type, for example of the type described in EP 2,789,276.

Typically an espresso coffee machine 10 receives water from a tank or a pipe 1 and, by means of a pump 2, sends this cold water under pressure to the components downstream. In other embodiments, the pump 2 is not present since a pressure (typically from the mains water supply) sufficient for correct operation of the machine is in any case ensured. This pressure for example may be about 3 bar.

Downstream of the pump 2 there may be a solenoid valve 3 and a coffee boiler 4. Inside the coffee boiler 4 the water is heated up to a reference temperature, indicated below as Trif.

A group 9 for dispensing the beverage (espresso coffee or the like) has a fluid connection with the coffee boiler 4. In some machines, two or more dispensing groups 9 are connected to the same coffee boiler. Each dispensing group 9 is configured such that a portafilter (also termed filter holder) 5 may be attached in a removable manner. In turn, each portafilter 5 comprises a body, which is typically substantially cylindrical, with a closed bottom provided with one or more nozzles 51. The body of the portafilter 5 is configured to support a filter 52 filled at least partly with pressed coffee powder 53.

In order to prepare an espresso coffee, the hot water under pressure, which is contained inside the coffee boiler 4, is made to pass through the coffee powder 53, percolate from the filter 52 and flow out from the nozzle 51 (or nozzles).

The machine 10 preferably also comprises a substantially closed box-like body and a support surface, with associated drip tray, for resting cups or other containers during dispensing of the beverage.

FIG. 1 also shows, in schematic form, a processor 8 (CPU or the like) for managing certain electrical and/or electronic functions of the machine. Preferably, the processor 8 is mounted on an electronic board. For the purposes of the present invention, the term "processor" comprises not only a CPU or the like, but also other electric and/or electronic components such as one or more memories (preferably non-volatile memories), relays, connectors or similar components.

For the purposes of the present invention, the processor 8 is connected to a temperature sensor 7 which is configured to sense the temperature of the water inside the coffee boiler. The processor 8 is also connected to a heating element for heating the water inside said coffee boiler. The heating element may comprise, typically, an electrical resistance. Obviously, the connection between the processor 8 and the heating element may be a physical connection (for example via a cable), but preferably it is an indirect or logic connection. For example, the processor 8 could control switching on or switching off of the heating element (for example the electrical resistance) by operating a relay or the like.

As mentioned above, the processor may also manage other important functions of the machine, which, however, are not relevant for the purposes of the present invention. On the basis of the diagram shown in FIG. 1, the processor may be connected to the pump 2 and/or to the solenoid valve 3.

The connections in the diagram of FIG. 1 are shown as physical cable connections, but may also be wireless using any data transmission standard for wireless personal area networks (WPAN), for example Bluetooth, Zigbee or the like. In any case, the cable connection is preferred.

Typically the processor 8 is configured to maintain a certain desired reference temperature inside the coffee boiler. The processor controls the switching on or the switching off of the heating element on the basis of the temperature sensed by the temperature sensor. In particular, if the temperature of the sensor is lower than a reference temperature (desired temperature), the processor 8 causes switching on of the heating element, otherwise the processor 8 causes switching off of the heating element.

Preferably, in order to increase the thermal stability, the processor 8 does not perform merely a comparison between the reference temperature and the temperature detected by the temperature sensor 7, but uses a more sophisticated logic system. Preferably, according to the present invention, the processor 8 employs a so-called Proportional-Integral-Derivative or Proportional-Integrative-Derivative (PID) controller system. As is known, the PID system is a feedback system generally used in control systems. Owing to an input which determines the current value, the system is able to react to any positive or negative errors which tend towards the value 0. The reaction to the error may be regulated and this makes this system very versatile. Basically, the PID technique considers also the derivative and the integral of the temperature difference.

According to the present invention, the reference temperature Trif is not constant, but is varied as a function of at least one of the following:
 (a) a first parameter indicative of the frequency of use of the machine and/or the time elapsed from a reference extraction cycle;
 (b) a second parameter indicative of the temperature of a component of the machine, preferably a component acted on by the water flow during the preparation and/or dispensing of the beverage; and
 (c) a third environmental parameter indicative of the environment in which the machine is installed.

As regards the parameter (a), the Applicant has realized that the temperature of the dispensing water, and therefore the temperature of the beverage, is influenced among other things by the frequency with which the espresso coffee machine is used and/or the time elapsed from an extraction cycle taken as a reference cycle. Advantageously, the last (or penultimate) coffee dispensing operation performed by the machine may be taken as the reference extraction cycle.

According to the Applicant, the use of the machine with varied frequency (a lot of coffees per hour or a few coffees per hour) forces the water to release different quantities of heat. This means that the water, which reaches the coffee powder, has a different temperature depending on the use.

According to the present invention, the processor 8 is configured to modify suitably the reference temperature Trif of the water inside the boiler over time in order to compensate for the temperature drops caused by infrequent use of the machine. In other words, if a major decrease in the temperature of the water is expected, then Trif will be correspondingly increased. If, on the other hand, only a slight drop in temperature is expected, Trif will be increased less than in the preceding case. If the machine is operating under normal conditions and is being used with a certain continuity, Trif will not be increased, namely will be kept unvaried.

For example, if the time elapsed from the last beverage extraction cycle is considered as the significant parameter for modifying the reference temperature Trif, with the time from the last dispensing operation being termed t0, Trif may be modified by the processor 8 according to an expression as follows:

$t_0 < t_1$: Trif_new=Trif+$\Delta T1$;

$t_1 < t_0 < t_2$: Trif_new=Trif+$\Delta T2$;

$t_2 < t_0 < t_3$: Trif_new=Trif+$\Delta T3$;

. . .

$t_{n-1} < t_0 < t_n$: Trif_new=Trif+$\Delta Tn$;

where
 $t_0, t_1, t_2, t_3 \ldots t_{n-1}, t_n$ are quantified times,
 $t_1, t_2 < \ldots < t_n$, and
 $\Delta T1, \Delta T2, \ldots \Delta Tn$ are temperatures (positive, negative or zero) where n=1, 2, 3, . . . . Typically n may be comprised between 2 and 4.
For example, if:
 $t_0 < 30$ s Trif_new=Trif+0° C.
 30 s$< t_0 <$60 s Trif_new=Trif+1° C.
 60 s$<$t0$<$90 s Trif_new=Trif+2° C.
 $t_0 >$90 s Trif_new=Trif+3° C.

Obviously, as soon as a regular frequency of use is re-established—even after a prolonged period of inactivity (involving for example an increase of Trif by 3° C.), Trif_new will be Trif_new=Trif+0° C.

In addition or as an alternative to the aforementioned criterion based on the time elapsed from the least dispensing operation, the processor of the temperature regulating system may be configured to modify the reference temperature Trif on the basis of the number of extraction cycles within a certain time interval. This time interval may be a few seconds or a few minutes, for example 1, 5 or 10 minutes.

According to the present invention, if the number of extraction cycles in the period is less than a predefined threshold, it may be necessary to increase the temperature of the water in the coffee boiler and therefore increase Trif. Therefore, the processor 8 acts so as to increase the temperature of the heater device correspondingly.

If the number of extraction cycles corresponds to a set value or is within a set time interval of extraction cycles, the processor does not increase the temperature Trif.

On some occasions, should the temperature inside the coffee boiler be too high (for some reason), the processor could act so as to switch off the power supply to the resistance.

As mentioned above, in addition or as an alternative to the aforementioned criterion of variation of Trif, the reference temperature Trif may be varied as a function of a second parameter indicative of the temperature of a component of the machine, preferably a component acted on by the flow of water during dispensing of a beverage.

In other words, the processor of the system for regulating the temperature of the water inside the coffee boiler could also be controlled by temperature information of one or more components of the espresso coffee machine, including the dispensing group.

For example, the processor could be configured to receive temperature information relating to the temperature of a solenoid valve, a union, a pipe, a connector, the portafilter, the filter basket in which it is contained or another component passed through by the flow of water flowing out of the boiler and reaching the filter. In this way the processor acts so as to increase the temperature Trif as a function of the temperature of one or more components, which is in turn indicative of the drop in temperature which would affect the water flowing from the boiler to the dispensing group. Therefore, if the temperature of a predetermined component is less than a certain value, it may be necessary to increase the temperature of the water inside the coffee boiler. Therefore, the processor acts so as to increase the temperature of the heater device in a corresponding manner.

Obviously, in addition to the case where it is required to increase the temperature in response to a non-optimum temperature of a certain component in the machine, the situation could also arise where the temperature of that component is within a certain optimum temperature range or, on the contrary, is too high. In these cases the processor operates accordingly.

As mentioned above, in addition or as an alternative to the aforementioned criteria of variation of Trif (considered singly or in combination), the reference temperature may be varied as a function of a third environmental parameter indicative of the environment in which the machine is installed.

This environmental information, for example, may include the ambient temperature of the room in which the machine is installed, the external temperature, the atmospheric pressure or the humidity. For example, if the temperature inside the room in which the machine is installed is lower than a certain value, it may be necessary to increase the temperature Trif.

Figure 2:
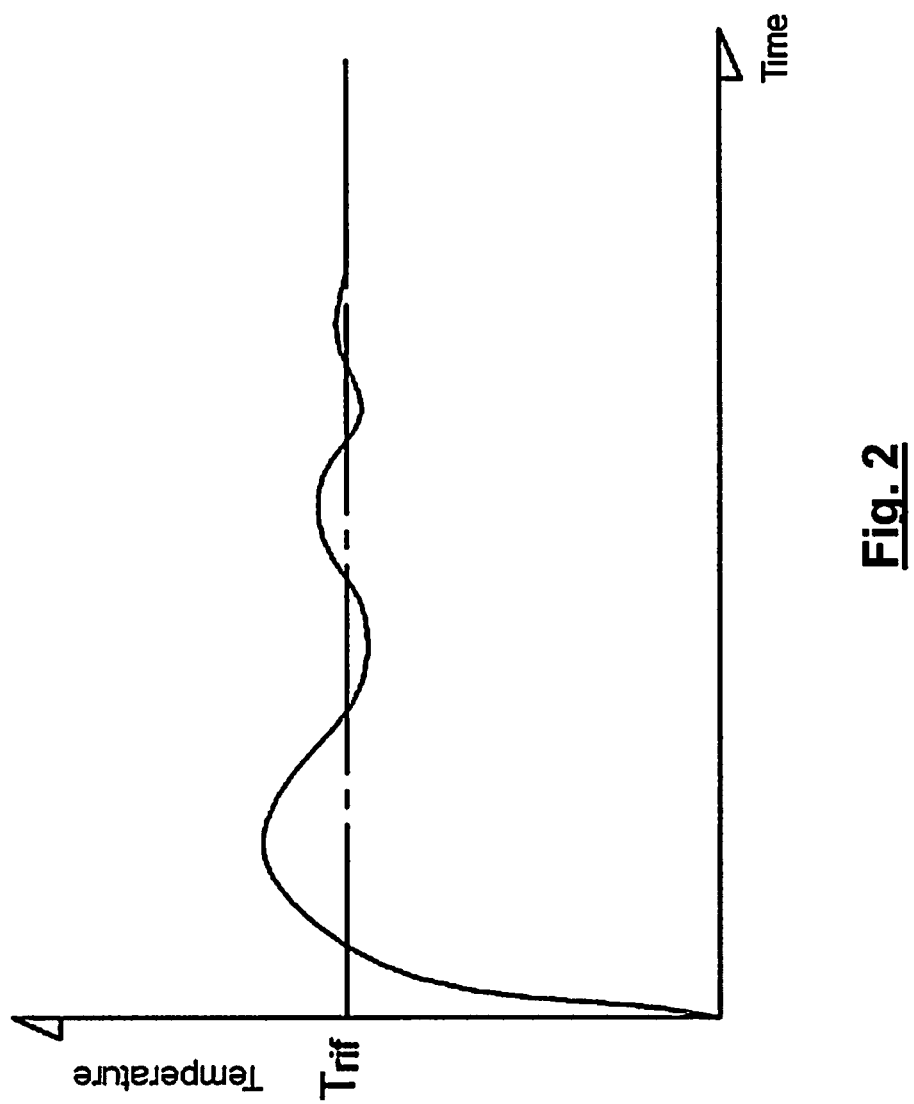
FIG. 2 is a first temperature vs. time graph.

FIG. 2 is a graph showing the progression of the water temperature against time. As can be seen, owing to the effect of a regulating system according to the present invention (comprising a feedback system of the PID or similar type) the temperature is adjusted to a value in the region of the set reference temperature (Trif). The form of the graph is purely of a qualitative nature.

FIG. 3 is also a graph showing the progression of the water temperature against time. The graph in FIG. 3 illustrates in qualitative terms variation of the Trif for one or more of the aforementioned criteria (a), (b) and/or (c). As can be seen from FIG. 3, owing to the effect of a regulating system according to the present invention (comprising a feedback system of the PID or similar type) the temperature is adjusted to a value in the region of the set reference temperature (Trif) or in the region of the new set temperature Trif_new.

The invention claimed is:

1. A machine for preparing and dispensing espresso coffee comprising:
    a water supply;
    a dispensing group and a corresponding coffee boiler containing water under pressure;
    a heater device for heating the water in the coffee boiler;
    a temperature sensor for measuring the temperature of the water in the coffee boiler;
    a processor connected to said temperature sensor and configured to drive said heater device so that said water in the coffee boiler is at a reference temperature,
    wherein said processor comprises a feedback system; and
    wherein the value of said reference temperature is varied as a function of a quantified time elapsed from a machine operating cycle or a frequency of use of the machine within a time interval.

2. The machine for preparing and dispensing espresso coffee according to claim 1, wherein said processor is configured to control the switching on or switching off of the heater device on the basis of the temperature sensed by the temperature sensor.

3. The machine for preparing and dispensing espresso coffee according to claim 1, wherein said heater device comprises an electrical resistance.

4. The machine for preparing and dispensing espresso coffee according to claim 1, wherein said feedback system comprises a Proportional-Integral-Derivative or Proportional-Integrative-Derivative controller.

5. The machine for preparing and dispensing espresso coffee according to claim 1, wherein said value of said reference temperature is varied as a function of time elapsed since a last machine operating cycle.

6. The machine for preparing and dispensing espresso coffee according to claim 5, wherein a first parameter for varying said reference temperature (Trif, Trif_new) is the time elapsed since the last beverage extraction cycle, and if the last dispensing operation is termed to, Trif can be modified as follows:

$t_0 < t_1$:Trif_new=Trif+$\Delta T1$;

$t_1 < t_0 < t_2$:Trif_new=Trif+$\Delta T2$;

$t_2 < t_0 < t_3$:Trif_new=Trif+$\Delta T3$;

. . .

$t_{n-1} < t_0 < t_n$:Trif_new=Trif+$\Delta Tn$;

where:
$t_0, t_1, t_2, t_3, \ldots t_{n-1}, t_n$ are quantified times;
$t_1 < t_2 < \ldots < t_n$;
$\Delta T1, \Delta T2, \ldots \Delta Tn$ are temperatures; and
$n = 1, 2, 3, \ldots$.

7. The machine for preparing and dispensing espresso coffee according to claim 1, wherein the value of said reference temperature is further varied as a function of the temperature of a component of the machine which enters into contact with a flow of water from the coffee boiler during a beverage dispensing operation.

8. The machine for preparing and dispensing espresso coffee according to claim 1, wherein the value of said reference temperature is further varied as a function of the temperature of the environment in which the machine is installed.

9. A method for preparing and dispensing espresso coffee comprising:
    supplying water to a coffee boiler containing water under pressure;
    providing a dispensing group;
    heating the water in the coffee boiler;
    measuring the temperature of the water in the coffee boiler;
    controlling the heating of water in the coffee boiler so that said water in the coffee boiler is at a reference temperature;
    providing a feedback system; and
    varying said value of said reference temperature (Trif, Trif_new) as a function of a quantified time elapsed from a machine operating cycle or a frequency of use of the machine within a time interval.

10. The method according to claim 9, wherein said value of said reference temperature is varied as a function of a time elapsed since a last machine operating cycle.

11. The method according to claim 9, wherein the parameter for varying said reference temperature is the time elapsed since a last beverage extraction cycle, and if the time of the last dispensing operation is termed to, Trif can be modified as follows:

$$t_0 < t_1 : \text{Trif\_new} = \text{Trif} + \Delta T1;$$

$$t_1 < t_0 < t_2 : \text{Trif\_new} = \text{Trif} + \Delta T2;$$

$$t_2 < t_0 < t_3 : \text{Trif\_new} = \text{Trif} + \Delta T3;$$

$$\ldots$$

$$t_{n-1} < t_0 < t_n : \text{Trif\_new} = \text{Trif} + \Delta Tn;$$

where:
$t_0$, $t_1$, $t_2$, $t_3$, $t_{n-1}$, $t_n$ are quantified times;
$t_1 < t_2 < \ldots < t_n$;
$\Delta T1$, $\Delta T2$, ... $\Delta Tn$ are temperatures; and
n=1, 2, 3, . . . .

12. The method according to claim 9, wherein the value of said reference temperature is further varied as a function of a second parameter which is a function of the temperature of a component of the machine which enters into contact with a flow of water from the coffee boiler during a dispensing operation.

13. A machine for preparing and dispensing espresso coffee comprising:
a dispensing group and a corresponding coffee boiler containing water under pressure;
a heater device for heating the water in the coffee boiler;
a temperature sensor for measuring the temperature of the water in the coffee boiler;
a processor connected to said temperature sensor and configured to drive said heater device so that said water in the coffee boiler is at a reference temperature, and to vary the value of said reference temperature according to a function in which a parameter is a quantified time elapsed from a machine operating cycle or a frequency of use of the machine within a time interval.

14. The machine for preparing and dispensing espresso coffee according to claim 13, wherein said the value of said reference temperature is varied according to a function in which the parameter is a quantified time elapsed since a last machine operating cycle.

15. The machine for preparing and dispensing espresso coffee according to claim 14, wherein the parameter for varying said reference temperature (Trif, Trif_new) is the quantified time elapsed since a last beverage extraction cycle, and if the last dispensing operation is termed $t_0$, Trif can be modified as follows:

$$t_0 < t_1 : \text{Trif\_new} = \text{Trif} + \Delta T1;$$

$$t_1 < t_0 < t_2 : \text{Trif\_new} = \text{Trif} + \Delta T2;$$

$$t_2 < t_0 < t_3 : \text{Trif\_new} = \text{Trif} + \Delta T3;$$

$$\ldots$$

$$t_{n-1} < t_0 < t_n : \text{Trif\_new} = \text{Trif} + \Delta Tn;$$

where:
$t_0$, $t_1$, $t_2$, $t_3$, $t_{n-1}$, $t_n$ are quantified times;
$t_1 < t_2 < \ldots < t_n$;
$\Delta T1$, $\Delta T2$, ... $\Delta Tn$; and
n=1, 2, 3, . . . .

* * * * *